(12) United States Patent
Kobayashi

(10) Patent No.: US 8,598,959 B2
(45) Date of Patent: Dec. 3, 2013

(54) MODULATION APPARATUS, PHASE SETTING METHOD AND TEST APPARATUS

(75) Inventor: Norio Kobayashi, Gunma (JP)

(73) Assignee: Advantest Corporation, Tokyo (JP)

( * ) Notice: Subject to any disclaimer, the term of this patent is extended or adjusted under 35 U.S.C. 154(b) by 109 days.

(21) Appl. No.: 13/016,864

(22) Filed: Jan. 28, 2011

(65) Prior Publication Data

US 2011/0298557 A1    Dec. 8, 2011

(30) Foreign Application Priority Data

Mar. 23, 2010   (JP) .................................. 2010-066858

(51) Int. Cl.
*H04L 27/20* (2006.01)

(52) U.S. Cl.
USPC ............................ 332/103; 332/144; 332/161

(58) Field of Classification Search
USPC .......... 332/103, 144, 161; 375/261, 269, 281, 375/298
See application file for complete search history.

(56) References Cited

U.S. PATENT DOCUMENTS

| 6,091,941 | A * | 7/2000 | Moriyama et al. | 455/126 |
| 7,646,801 | B2 * | 1/2010 | Farag et al. | 375/146 |
| 2009/0074108 | A1 * | 3/2009 | Demir et al. | 375/298 |

FOREIGN PATENT DOCUMENTS

JP    H06-6394 A    1/1994

OTHER PUBLICATIONS

Sundström, "Spectral Sensitivity of LINC Transmitters to Quadrature Modulator Misalignments", IEEE Transactions on Vehicular Technology, Jul. 2000, vol. 49, No. 4, pp. 1474-1487.
Casadevall et al., "Performance Analysis of QAM Modulations Applied to the LINC Transmitter", IEEE Transactions on Vehicular Technology, Nov. 1993, vol. 42, No. 4, pp. 399-406 Downloaded on Mar. 17, 2009.
Poitau et al., "Experimental Characterization of LINC Outphasing Combiners' Efficiency and Linearity", IEEE Radio and Wireless Conference, 2004, pp. 87-90.
Woo et al., "SDR Transmitter Based on LINC Amplifier with Bias Control", Microwave Symposium Digest, IEEE MTT-S International, 2003, pp. 1703-1706. Downloaded on Apr. 10, 2009.
Zhang et al., "Design of Linear RF Outphasing Power Amplifiers", Artech House, 2003, pp. 102-103, USA.

* cited by examiner

*Primary Examiner* — Joseph Chang
*Assistant Examiner* — Jeffrey Shin

(57) ABSTRACT

A modulation apparatus comprising a first modulating section that outputs a first modulated signal having a fixed amplitude and a set phase; a second modulating section that outputs a second modulated signal having the fixed amplitude and a set phase; an adding section that outputs the output signal as the sum of the first and second modulated signals; a calculating section that calculates two phases to be set respectively in the first and second modulating sections, based on designated amplitude and phase; an allocating section that allocates, for the first and second modulated signals, the two phases calculated by the calculating section such that the first and second modulated signals are each connected more smoothly; and a setting section that sets the phase allocated for the first modulated signal in the first modulating section and sets the phase allocated for the second modulated signal in the second modulating section.

19 Claims, 12 Drawing Sheets

MODULATION APPARATUS, PHASE SETTING METHOD AND TEST APPARATUS

BACKGROUND

1. Technical Field

The present invention relates to a modulation apparatus, a phase setting method, and a test apparatus.

2. Related Art

A conventional LINC circuit is known that outputs a modulated signal, as shown in Non-Patent Documents 1 to 5, for example. The LINC circuit uses two IQ modulators to generate two modulated signals with different phases and fixed amplitudes, and outputs the desired amplitude and phase signals by adding together the two modulated signals generated by the two IQ modulators. This type of LINC circuit can output a signal with a high amplitude and low distortion, regardless of the linearity of the amplifier at the output stage.

Non-Patent Document 1: Lars Sundström, "Spectral Sensitivity of LINC Transmitters to Quadrature Modulator Misalignments", IEEE TRANSACTIONS ON VEHICULAR TECHNOLOGY, VOL. 49, NO. 4, JULY 2000

Non-Patent Document 2: Fernando J. Casadevall, and Antonio Valdovinos, "Performance Analysis of QAM Modulations Applied to the LINC Transmitter", IEEE TRANSACTIONS ON VEHICULAR TECHNOLOGY, VOL. 42, NO. 4, NOVEMBER 1993

Non-Patent Document 3: Gwenael Poitau, Ahmed Birafane and Ammar Kouki, "Experimental Characterization of LINC Outphasing Combiners' Efficiency and Linearity", IEEE Radio and Wireless Conference, 2004

Non-Patent Document 4: Young Yun Woo, Jaehyok Yi, Youngoo Yang, and Bumman Kim, "SDR Transmitter Based on LINC Amplifier with Bias Control", Microwave Symposium Digest, 2003 IEEE MTT-S International Non-Patent Document 5: Xuejun Zhang, Lawrence E. Larson, and Peter Asbeck, "Design of Linear RF Outphasing Power Amplifiers", (USA), Artech House, 2003

In a LINC circuit, the control section calculates two phases based on the phase and amplitude designated from the outside, and sets the two calculated phases in the two IQ modulators. Regardless of which of the two IQ modulators the two calculated phases are set in, the amplitude and phase of the output signal from the LINC circuit are theoretically the same. However, if the frequency bands of the modulated signals output from the IQ modulators are wide, the distortion of the output signal is increased by the hardware.

Furthermore, when the amplitude of the output signal is zero, two modulated signals differing by 180° should be output. However, the frequency band widens if the phases of the two modulated signals are not set appropriately, and this increases the distortion in the output signal due to the hardware.

If the phases for the two IQ modulators are set to achieve band-limiting, the distortion in the modulated signals due to the hardware is decreased. However, the error of the phases set for the two IQ modulators increases. On the other hand, if the phases for the two IQ modulators are not set to achieve band-limiting, the phases of the two IQ modulators can be set in the usual manner but the distortion of the output signal increases.

SUMMARY

Therefore, it is an object of an aspect of the innovations herein to provide a modulation apparatus, a phase setting method, and a test apparatus, which are capable of overcoming the above drawbacks accompanying the related art. The above and other objects can be achieved by combinations described in the independent claims. According to a first aspect related to the innovations herein, provided is a modulation apparatus that outputs an output signal having a designated amplitude and a designated phase. The modulation apparatus comprises a first modulating section that outputs a first modulated signal having a predetermined fixed amplitude and a set phase; a second modulating section that outputs a second modulated signal having the fixed amplitude and a set phase; an adding section that outputs the output signal to be the sum of the first modulated signal and the second modulated signal; a calculating section that calculates two phases to be set respectively in the first modulating section and the second modulating section, based on the designated amplitude and the designated phase; an allocating section that allocates, for the first modulated signal and the second modulated signal, the two phases calculated by the calculating section such that the first modulated signal and the second modulated signal are each connected more smoothly; and a setting section that sets the phase allocated for the first modulated signal in the first modulating section and sets the phase allocated for the second modulated signal in the second modulating section. Also provided is a phase setting method and a test apparatus.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
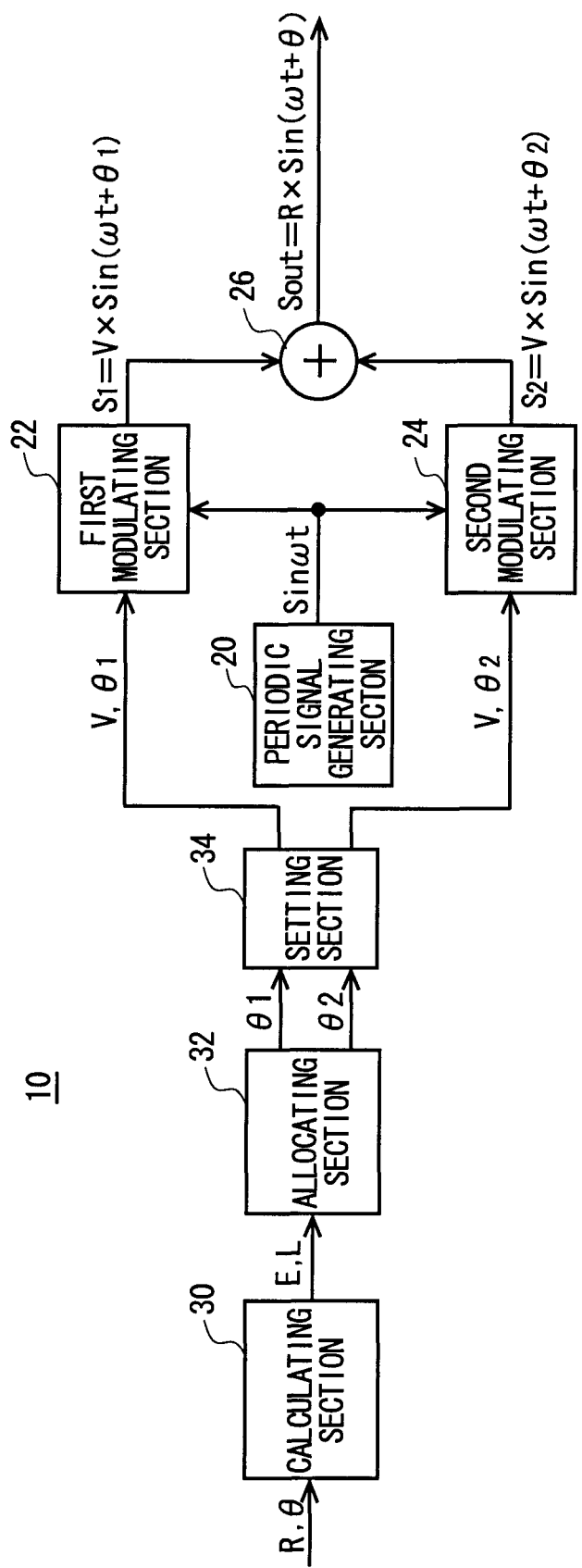
FIG. 1 shows a configuration of a modulation apparatus 10 according to an embodiment of the present invention.

FIG. 1 shows a configuration of a modulation apparatus 10 according to an embodiment of the present invention. The modulation apparatus 10 outputs an output signal (Sout) with a prescribed frequency and a designated amplitude (R) and designated phase (θ) designated from the outside. The modulation apparatus 10 is an example of a so-called LINC (linear amplification using non-linear components) circuit.

The modulation apparatus 10 includes a periodic signal generating section 20, a first modulating section 22, a second modulating section 24, an adding section 26, a calculating section 30, an allocating section 32, and a setting section 34. The periodic signal generating section 20 generates a periodic signal with a predetermined frequency. For example, the periodic signal generating section 20 may generate a sinusoidal signal (Sin ωt) with an angular frequency (ω) as the periodic signal. The periodic signal generating section 20 may generate, as the periodic signal, a square-wave signal that includes the sinusoidal signal (Sin ωt) with angular frequency (ω) as a primary component.

The first modulating section 22 outputs a first modulated signal ($S_1$) with a first phase ($θ_1$) set by the setting section 34 and a predetermined fixed amplitude (V). The first modulating section 22 may output the first modulated signal ($S_1$=V× Sin(ωt+$θ_1$)) with the first phase ($θ_1$) and the fixed amplitude (V) by performing orthogonal modulation on the periodic signal (Sin ωt) generated by the periodic signal generating section 20.

The second modulating section 24 outputs a second modulated signal ($S_2$) with a second phase ($θ_2$) set by the setting section 34, a predetermined fixed amplitude (V), and a frequency equal to the frequency of the first modulated signal ($S_1$). The second modulating section 24 may output the second modulated signal ($S_2$=V×Sin(ωt+$θ_2$)) with the second phase ($θ_2$) and the fixed amplitude (V) by performing orthogonal modulation on the periodic signal (Sin ωt) generated by the periodic signal generating section 20. The first modulating section 22 and the second modulating section 24 may each include a phase modulator and an amplifier that amplifies the signal output from the phase modulator to the fixed amplitude (V).

The adding section 26 adds together the first modulated signal ($S_1$) with fixed amplitude output from the first modulating section 22 and the second modulated signal ($S_2$) with fixed amplitude output from the second modulating section 24, and outputs the result as the output signal (Sout=V×Sin (ωt+$θ_1$)+V×Sin(ωt+$θ_2$)). The adding section 26 can output an output signal (Sout=R×Sin(ωt+θ)) having the designated amplitude (R) and the designated phase (θ).

The calculating section 30 calculates two phases (E, L) to be set in the first modulating section 22 and the second modulating section 24, based on the designated amplitude (R) and the designated phase (θ). The method for calculating the two phases (E, L) to be set in the first modulating section 22 and the second modulating section 24 is explained in detail further below.

The allocating section 32 allocates one of the two phases (E, L) calculated by the calculating section 30 to the first modulated signal ($S_1$) and allocates the other to the second modulated signal ($S_2$). More specifically, the allocating section 32 allocates to the first modulated signal ($S_1$) and the second modulated signal ($S_2$) the two phases (E, L) calculated by the calculating section 30 such that the first modulated signal ($S_1$) and the second modulated signal ($S_2$) are more smoothly connected to each other.

In other words, the allocating section 32 allocates one of the phases to the first modulated signal ($S_1$) and the other phase to the second modulated signal ($S_2$) in a manner to increase the continuity of the first modulated signal ($S_1$) and the second modulated signal ($S_2$) with respect to previous samples. In this way, the allocating section 32 can allocate the two phases (E, L) calculated by the calculating section 30 such that the frequency bands of both the first modulated signal ($S_1$) and the second modulated signal ($S_2$) become narrower. The allocation method used by the allocating section 32 is described in detail further below.

The setting section 34 sets the phase allocated to the first modulated signal ($S_1$) in the first modulating section 22, and sets the phase allocated to the second modulated signal ($S_2$) in the second modulating section 24.

The modulation apparatus 10 is supplied with data that indicates the designated amplitude (R) and the designated phase (θ) for each predetermined sampling rate. The modulation apparatus 10 can output the output signal (Sout=R×Sin (ωt+θ)) having the designated amplitude (R) and the designated phase (θ) for each sampling rate.

Figure 2:
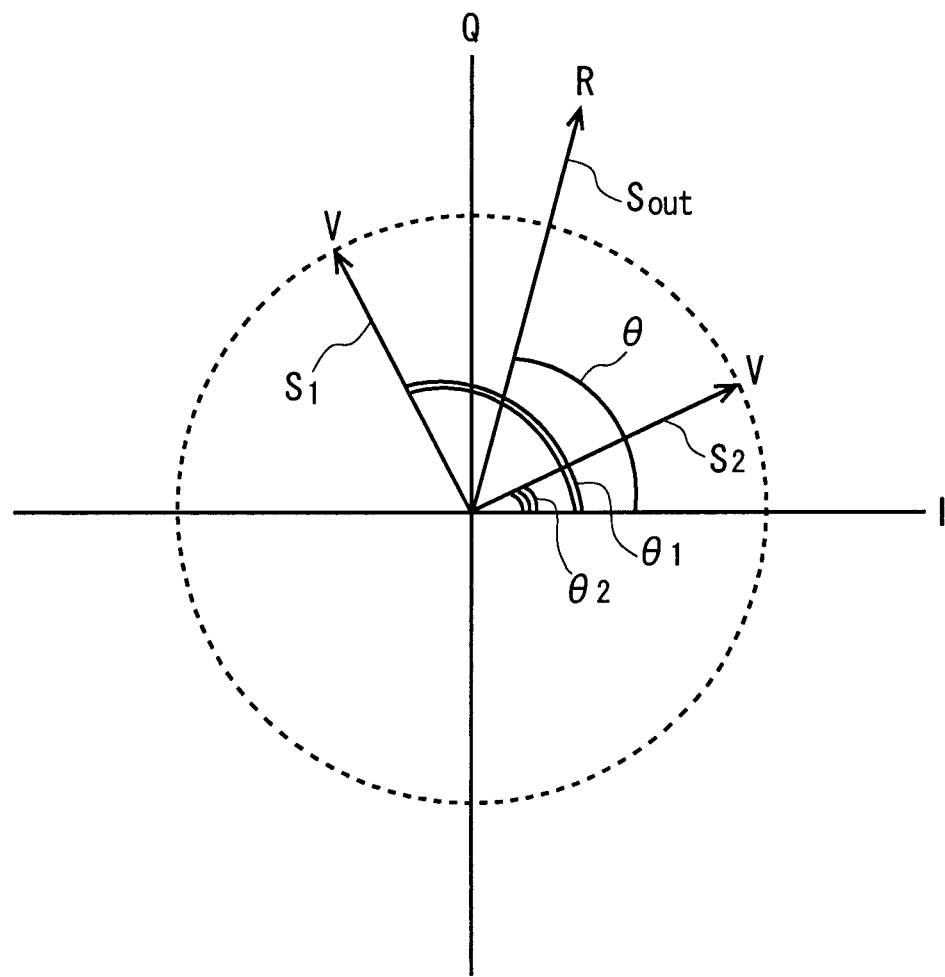
FIG. 2 shows exemplary phases and amplitudes of the output signal (Sout), the first modulated signal ($S_1$), and the second modulated signal ($S_2$) in the present embodiment.

FIG. 2 shows exemplary phases and amplitudes of the output signal (Sout), the first modulated signal ($S_1$), and the second modulated signal ($S_2$) in the present embodiment. When the phase of the periodic signal generated from the periodic signal generating section 20 is zero, the first modulating section 22 and the second modulating section 24 output a first modulated signal ($S_1$) and a second modulated signal ($S_2$) such as shown in FIG. 2.

Specifically, the first modulating section 22 outputs the first modulated signal ($S_1$) with a fixed amplitude V and a first phase $θ_1$. The second modulating section 24 outputs the second modulated signal ($S_2$) with a fixed amplitude V and a second phase $θ_2$.

The adding section 26 outputs the output signal (Sout) as the vector sum of the first modulated signal ($S_1$) and the second modulated signal ($S_2$). In other words, the phase (θ) of the output signal (Sout) becomes the center (($θ_1$+$θ_2$)/2) of the first phase $θ_1$ and the second phase $θ_2$. The amplitude (R) of the output signal (Sout) is obtained as the sum of the cosine component (V×Cos($θ_1$−(($θ_1$+$θ_2$)/2))) of the first modulated signal ($S_1$) and the cosine component (V×Cos($θ_2$−(($θ_1$+$θ_2$)/2))) of the second modulated signal ($S_2$), when the center (($θ_1$+$θ_2$)/2) of the first phase $θ_1$ and the second phase $θ_2$ is used as a reference.

In FIG. 2, the first phase $θ_1$ is shown as being ahead of the phase (θ) of the output signal (Sout) and the second phase $θ_2$ is shown as being behind the phase (θ) of the output signal (Sout), but the phases are not limited to this. In other words, the first phase $θ_1$ may be behind the phase (θ) of the output signal (Sout) and the second phase $θ_2$ may be ahead of the phase (θ) of the output signal (Sout).

Figure 3:
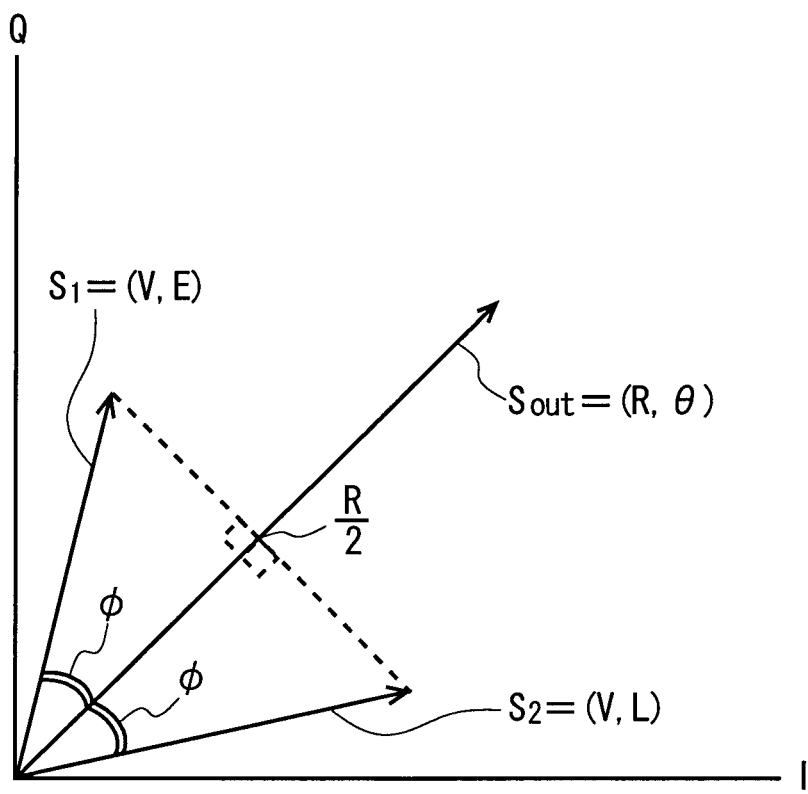
FIG. 3 shows an exemplary method for calculating the two phases (E, L) to be set in the first modulating section 22 and the second modulating section 24, when a designated amplitude (R) and designated phase (θ) are supplied thereto.

FIG. 3 shows an exemplary method for calculating the two phases (E, L) to be set in the first modulating section 22 and the second modulating section 24, when a designated amplitude (R) and designated phase (θ) are supplied thereto. Upon receiving the designated amplitude (R) and designated phase (θ) from the outside, the calculating section 30 calculates the adjustment phase (φ) as shown below in Expression 1.

$$\phi = \cos^{-1}((R/2)/V) \qquad (1)$$

In other words, the calculating section 30 calculates the adjustment phase ($\phi$) to be the arc-cosine ($\cos^{-1}((R/2)/V)$) of a ratio of half the designated amplitude (R) to the predetermined fixed amplitude (V). Next, the calculating section 30 calculates the two phases (E, L) to be set for the first modulating section 22 and the second modulating section 24, as shown below in Expressions 2 and 3.

$$E = Ph(\theta + \phi) \quad (2)$$

$$L = Ph(\theta - \phi) \quad (3)$$

In other words, the calculating section 30 calculates the phase (E=$\theta$+$\phi$) that is the sum of the designated phase ($\theta$) and the adjustment phase ($\phi$), which is the phase reached by advancing by the adjustment phase ($\phi$) from the designated phase. The calculating section 30 calculates the phase (L=$\theta$-$\phi$) that is obtained by subtracting the adjustment phase ($\phi$) from the designated phase ($\theta$), which is the phase reached by delaying by the adjustment phase ($\phi$) from the designated phase.

The allocating section 32 allocates one of the two phases (E, L) calculated by the calculating section 30 to the first modulated signal ($S_1$) and allocates the other to the second modulated signal ($S_2$). In the example of FIG. 3, the phase (E) reached by advancing by the adjustment phase ($\phi$) from the designated phase is set for the first modulated signal ($S_1$) and the phase (L) reached by delaying by the adjustment phase ($\phi$) from the designated phase is set for the second modulated signal, but opposite allocation may be used instead.

Figure 4:
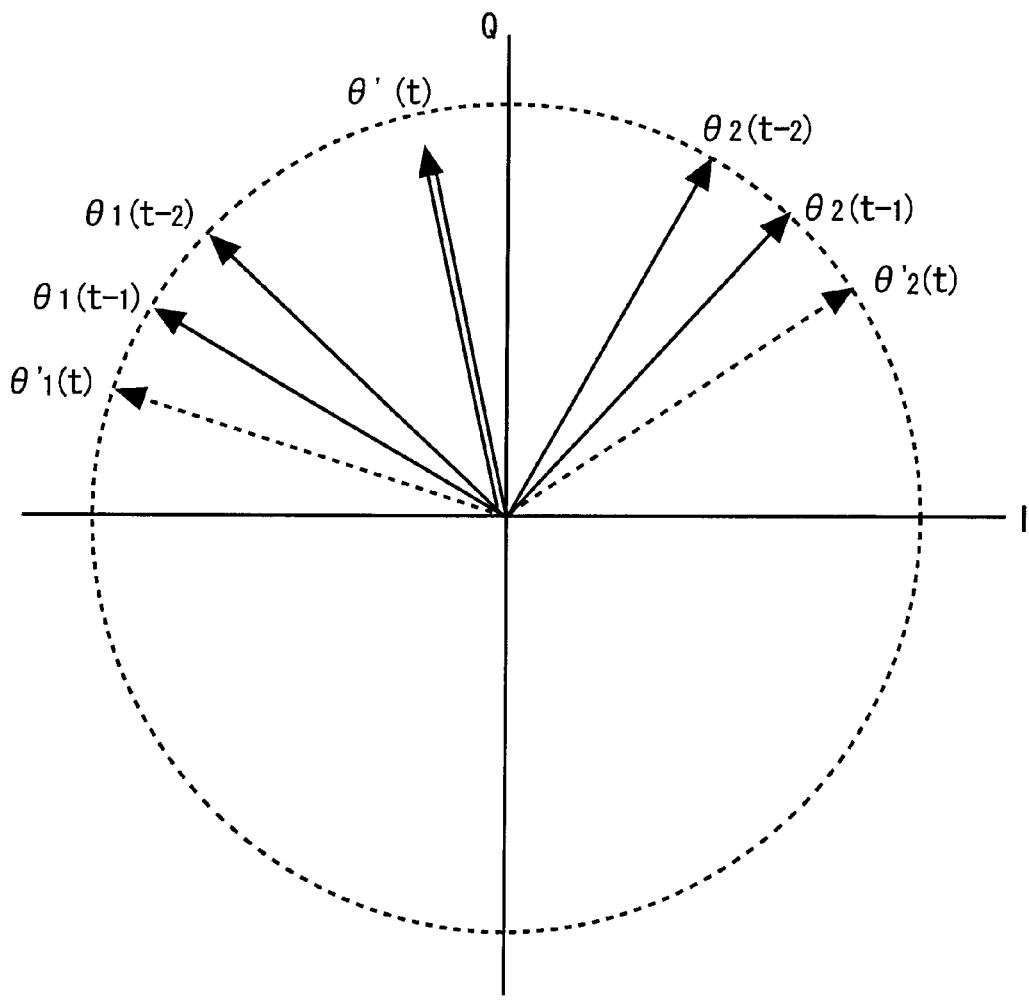
FIG. 4 shows examples of phases of the first modulated signal and the second modulated signal two samples earlier, phases of the first modulated signal and the second modulated signal one sample earlier, and phases of the first modulated signal and the second modulated signal predicted for a current sample.
Figure 5:
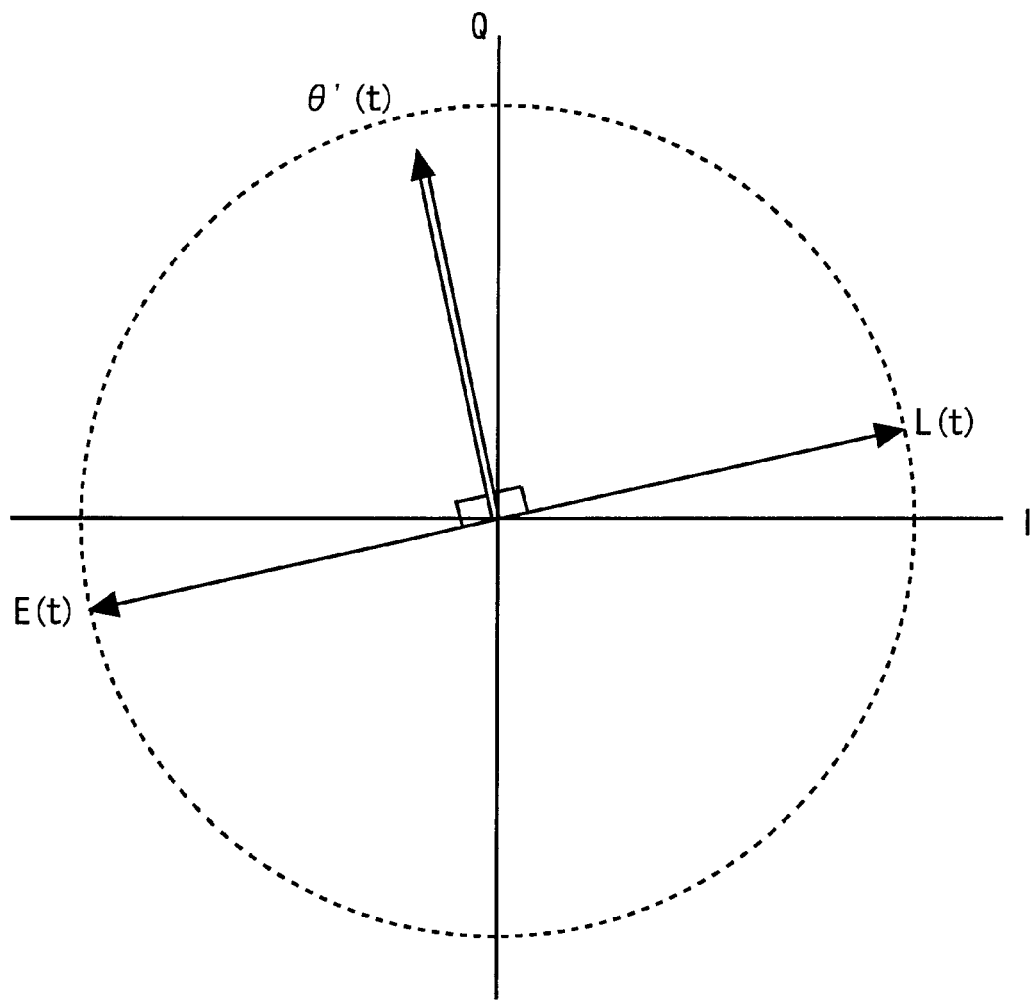
FIG. 5 shows examples of the two phases calculated by the calculating section 30 when the designated amplitude is zero.

FIG. 4 shows examples of phases of the first modulated signal and the second modulated signal two samples earlier, phases of the first modulated signal and the second modulated signal one sample earlier, and predicted phases of the first modulated signal and the second modulated signal predicted for a current sample. FIG. 5 shows examples of the two phases calculated by the calculating section 30 when the designated amplitude is zero.

When the phase difference between the two phases (E, L) is 180°, the amplitude of the output signal can be set to zero. Therefore, when the designated amplitude (R) is zero, the calculating section 30 calculates the two phases (E, L) differing from each other by 180° in the following manner, regardless of Expressions 1 to 3.

First, as shown in FIG. 4, the calculating section 30 calculates a first predicted phase $\theta'_1(t)$ predicted from previous signal points of the first modulated signal ($S_1$) and a second predicted phase $\theta'_2(t)$ predicted from previous signal points of the second modulated signal ($S_2$). For example, the calculating section 30 may calculate the first predicted phase $\theta'_1(t)$ and the second predicted phase $\theta'_2(t)$ as shown in Expressions 4 and 5 below.

$$\theta'_1(t) = Ph(\theta_1(t-1) + Ph(\theta_1(t-1) - \theta_1(t-2))) \quad (4)$$

$$\theta'_2(t) = Ph(\theta_2(t-1) + Ph(\theta_2(t-1) - \theta_2(t-2))) \quad (5)$$

Here, y=Ph(x) represents a function in which an input x returns a y value of $-180° \leq \theta \leq 180°$. This function is the same in other expressions.

As shown in Expression 4, the calculating section 30 calculates the first predicted phase $\theta'_1(t)$ of the first modulated signal ($S_1$) to be the sum of the phase $\theta_1(t-1)$ of the signal point one sample earlier and a value obtained by subtracting the phase $\theta_1(t-2)$ of the signal point two samples earlier from the phase $\theta_1(t-1)$ of the signal point one sample earlier in the first modulated signal ($S_1$). Similarly, as shown in Expression 5, the calculating section 30 calculates the second predicted phase $\theta'_2(t)$ of the second modulated signal ($S_2$) to be the sum of the phase $\theta_2(t-1)$ of the signal point one sample earlier and a value obtained by subtracting the phase $\theta_2(t-2)$ of the signal point two samples earlier from the phase $\theta_2(t-1)$ of the signal point one sample earlier in the second modulated signal ($S_2$).

Next, as shown in FIG. 4, the calculating section 30 calculates an intermediate phase $\theta'(t)$ of the first predicted phase $\theta'_1(t)$ and the second predicted phase $\theta'_2(t)$. In this case, the calculating section 30 calculates the intermediate phase $\theta'(t)$ on the narrow-angle side of the first predicted phase $\theta'_1(t)$ and the second predicted phase $\theta'_2(t)$.

As shown in FIG. 5, the calculating section 30 calculates a phase E(t) advanced by 90° from the intermediate phase $\theta'(t)$ and a phase L(t) delayed by 90° from the intermediate phase $\theta'(t)$, as the two phases (E, L) to be set in the first modulating section 22 and the second modulating section 24. In this way, the calculating section 30 can set the two phases (E, L) such that the frequency change of each of the first modulated signal ($S_1$) and the second modulated signal ($S_2$) decreases, i.e. such that the frequency bands thereof are narrowed, when the designated amplitude (R) is zero.

Instead of using Expressions 4 and 5, the calculating section 30 may use Expressions 6 and 7 shown below to calculate the first predicted phase $\theta'_1(t)$ and the second predicted phase $\theta'_2(t)$. In Expression 6, $v\theta_1(t)$ represents an average phase difference obtained by taking a weighted average of the phase differences between previous samples of the first modulated signal ($S_1$). In Expression 7, $v\theta_2(t)$ represents an average phase difference obtained by taking a weighted average of the phase differences between previous samples of the second modulated signal ($S_2$).

$$\theta'_1(t) = Ph(\theta_1(t-1) + v\theta_1(t)) \quad (6)$$

$$\theta'_2(t) = Ph(\theta_2(t-1) + v\theta_2(t)) \quad (7)$$

In other words, as shown in Expression 6, the calculating section 30 calculates the first predicted phase $\theta'_1(t)$ as the sum of the phase $\theta_1(t-1)$ of the signal point one sample earlier in the first modulated signal ($S_1$) and the average phase difference $v\theta_1(t)$ obtained as a weighted average of the phase differences between previous samples of the first modulated signal ($S_1$). As shown in Expression 7, the calculating section 30 calculates the second predicted phase $\theta'_2(t)$ as the sum of the phase $\theta_2(t-1)$ of the signal point one sample earlier in the second modulated signal ($S_2$) and the average phase difference $v\theta_2(t)$ obtained as a weighted average of the phase differences between previous samples of the second modulated signal ($S_2$).

The calculating section 30 calculates the average phase differences $v\theta_1(t)$ and $v\theta_2(t)$ using lower weights for the phase differences between earlier samples. For example, the calculating section 30 may calculate the average phase differences $v\theta_1(t)$ and $v\theta_2(t)$ as shown below in Expressions 8 and 9.

$$v\theta_1(t) = Ph(\gamma \times v\theta_1(t-1) + (1-\gamma) \times Ph(\theta_1(t-1) - \theta_1(t-2))) \quad (8)$$

$$v\theta_2(t) = Ph(\gamma \times v\theta_2(t-1) + (1-\gamma) \times Ph(\theta_2(t-1) - \theta_2(t-2))) \quad (9)$$

In Expressions 8 and 9, $\gamma$ is a predetermined effect coefficient in a range of $0 \leq \gamma < 1$. This effect coefficient represents the degree of effect of the average phase difference calculated between earlier samples with respect to the average phase difference of the current sample.

Here, $v\theta_1(t-1)$ represents the average phase difference one sample earlier calculated for the first modulated signal ($S_1$), and $v\theta_2(t-1)$ represents the average phase difference one sample earlier calculated for the second modulated signal ($S_2$).

In other words, the calculating section 30 calculates the average phase difference ($v\theta_1(t)$) of the first modulated signal to be the sum of a product ($\gamma \times v\theta_1(t-1)$) of the effect coefficient and the average phase difference one sample earlier in the first modulated signal and a product ($(1-\gamma) \times (\theta_1(t-1) - \theta_1(t-2))$) of a value obtained by subtracting the effect coefficient from 1 and a value obtained by subtracting the phase of the signal point two samples earlier from the phase of the signal point one sample earlier in the first modulated signal. Similarly, the calculating section 30 calculates the average phase difference ($v\theta_2(t)$) of the second modulated signal to be the sum of a product ($\gamma \times v\theta_2(t-1)$) of the effect coefficient and the average phase difference one sample earlier in the second modulated signal and a product ($(1-\gamma) \times (\theta_2(t-1) - \theta_2(t-2))$) of a value obtained by subtracting the effect coefficient from 1 and a value obtained by subtracting the phase of the signal point two samples earlier from the phase of the signal point one sample earlier in the second modulated signal.

The calculating section 30 may calculate the predicted phases in the manner described above. In this way, although the amount of calculation increases, the calculating section 30 can calculate predicted phases that can further decrease the frequency change.

Figure 6:
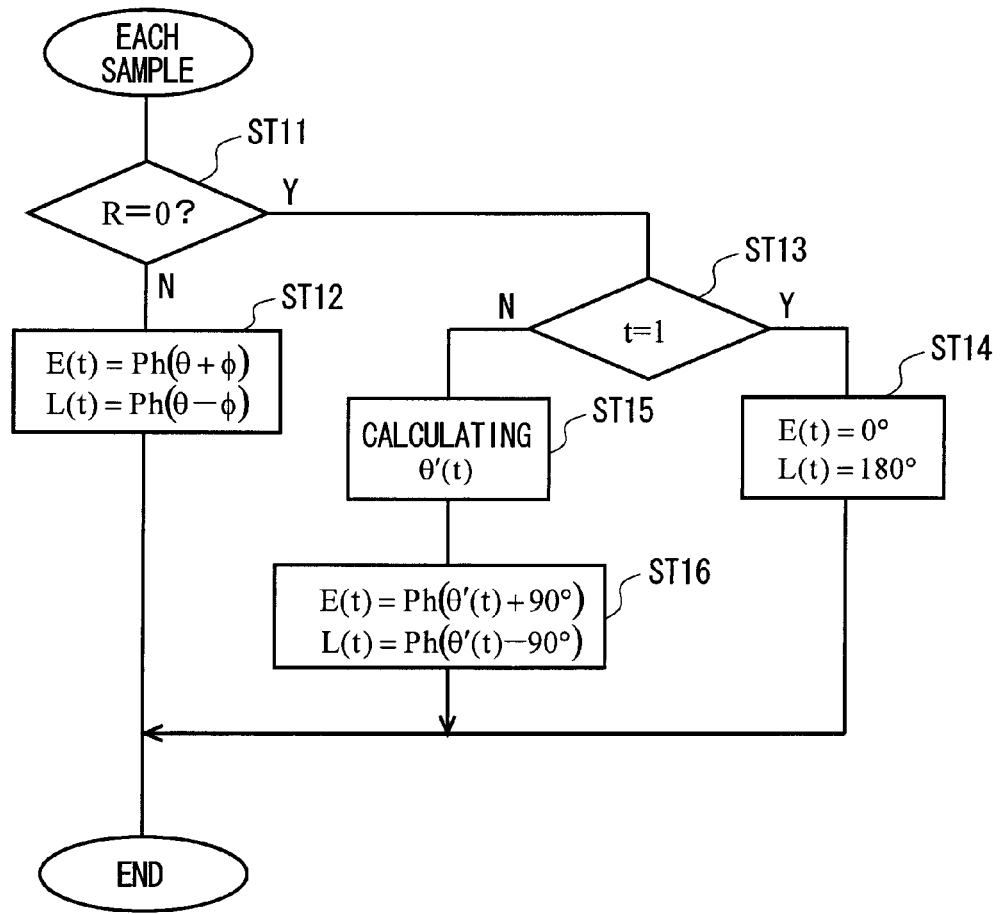
FIG. 6 shows an exemplary process flow of the calculating section 30 according to the present embodiment.

FIG. 6 shows an exemplary process flow of the calculating section 30 according to the present embodiment. For each sampling rate, the calculating section 30 performs the processes of steps ST12 to ST16 shown in FIG. 6.

First, the calculating section 30 determines whether the designated amplitude (R) is zero (ST11). When the designated amplitude (R) is not zero (the "No" of ST11), the calculating section 30 calculates a phase ($E(t)=Ph(\theta+\phi)$) obtained as the sum of the designated phase ($\theta$) and the adjustment phase ($\phi$) and a phase ($L(t)=Ph(\theta-\phi)$) obtained by subtracting the adjustment phase ($\phi$) from the designated phase ($\theta$) (ST12).

When the designated phase (R) is zero (the "Yes" of ST11), the calculating section 30 determines whether a first sample is being processed (ST13). If a first sample is being processed (the "Yes" of ST13), the calculating section 30 sets the two phases of 0° and 180° as the two phases (E, L) to be calculated (ST14). At step ST11, the calculating section 30 may calculate any two phases that differ from each other by 180°, instead of the two phases of 0° and 180°.

If a first sample is not being processed (the "No" of ST13), the calculating section 30 calculates the intermediate phase ($\theta'(t)$) (ST15). Next, the calculating section 30 calculates a phase ($E(t)=Ph(\theta'(t)+90°)$) obtained by adding 90° to the intermediate phase ($\theta'(t)$), and a phase ($L(t)=Ph(\theta'(t)-90°)$) obtained by subtracting 90° from the intermediate phase ($\theta'(t)$) (ST16).

The calculating section 30 outputs, to the allocating section 32 at the final stage, the two phases (E, L) set or calculated in the manner described above. In this way, the calculating section 30 can calculate the two phases (E, L) to be set in the first modulating section 22 and the second modulating section 24 when the designated amplitude (R) is zero.

Figure 7:
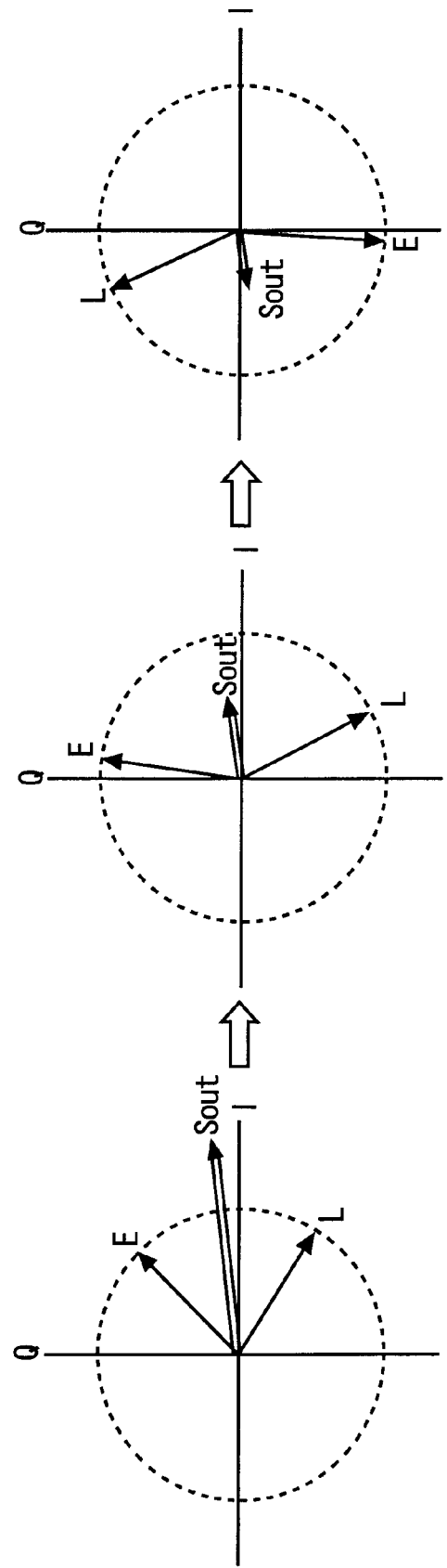
FIG. 7 shows exemplary transitions of the output signal (Sout) and the two phases (E, L) calculated by the calculating section 30.

FIG. 7 shows exemplary transitions of the output signal (Sout) and the two phases (E, L) calculated by the calculating section 30. FIG. 7 shows an example of an output signal (Sout) in which the designated amplitude (R) gradually decreases while the designated phase ($\theta$) is in a fixed state, the designated phase ($\theta$) inverts by 180° when the designated amplitude (R) becomes zero, and the designated amplitude (R) then gradually increases while the designated phase ($\theta$) is in a fixed state.

In the example of FIG. 7, among the two phases calculated by the calculating section 30, the phase (E) that is earlier than the designated phase appears in a first quadrant (a range from 0° to 90°) prior to the designated amplitude (R) becoming zero and appears in a third quadrant (a range from 180° to 270°) after the designated amplitude (R) has exceeded zero. Furthermore, the phase (L) that is later than the designated phase appears in a fourth quadrant (a range from 270° to 360°) prior to the designated amplitude (R) becoming zero and appears in a second quadrant (a range from 90° to 180°) after the designated amplitude (R) has exceeded zero.

If the phase (E) earlier than the designated phase is set in the first modulating section 22 and the phase (L) that is later than the designated phase is set in the second modulating section 24, when the output signal shown in FIG. 7 is output, the frequency changes of the first modulated signal ($S_1$) output from the first modulating section 22 and the second modulated signal ($S_2$) output from the second modulating section 24 increase.

Therefore, the allocating section 32 allocates the two phases (E, L) calculated by the calculating section 30 to the first modulated signal ($S_1$) and the second modulated signal ($S_2$) in a manner to more smoothly connect the first modulated signal ($S_1$) and the second modulated signal ($S_2$). In other words, the allocating section 32 allocates one of the phases to the first modulated signal ($S_1$) and the other phase to the second modulated signal ($S_2$), such that the continuity of both the first modulated signal ($S_1$) and the second modulated signal ($S_2$) is increased relative to the signal points of previous samples.

For example, the allocating section 32 may calculate a first combined change amount by combining the frequency change amount when the phase (E) is allocated to the first modulated signal ($S_1$) and the frequency change amount when the phase (L) is allocated to the second modulated signal ($S_2$). Furthermore, the allocating section 32 may calculate a second combined change amount by combining the frequency change amount when the phase (L) is allocated to the first modulated signal ($S_1$) and the frequency change amount when the phase (E) is allocated to the second modulated signal ($S_2$).

The allocating section 32 compares the first combined change amount to the second combined change amount, and if the first combined change amount is smaller, allocates the phase (E) to the first modulated signal ($S_1$) and allocates the phase (L) to the second modulated signal ($S_2$). If the second combined change amount is smaller, the allocating section 32 allocates the phase (L) to the first modulated signal ($S_1$) and allocates the phase (E) to the second modulated signal ($S_2$). In this way, the allocating section 32 can decrease the distortion of the output signal (Sout) caused by change of the first modulated signal ($S_1$) and the second modulated signal ($S_2$), by decreasing the frequency change amount of both the first modulated signal ($S_1$) and the second modulated signal ($S_2$).

Figure 8:
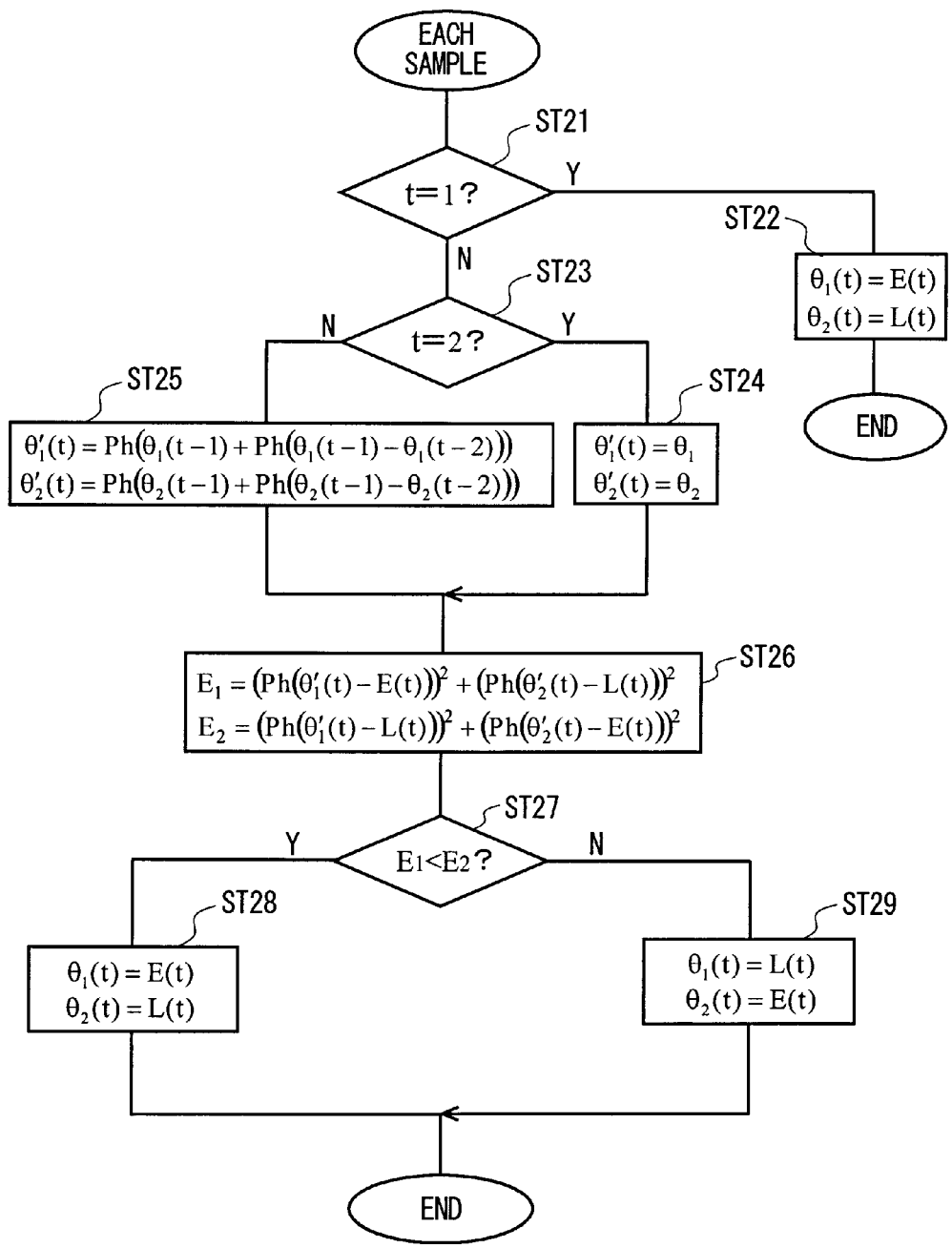
FIG. 8 shows a first process flow of the setting section 34 according to the present embodiment.

FIG. 8 shows a first process flow of the allocating section 32 according to the present embodiment. For each sampling rate, the allocating section 32 performs the processes from step ST21 to step ST29 shown in FIG. 8.

First, the allocating section 32 determines whether a first sample is being processed (ST21). If a first sample is being processed (the "Yes" of ST21), the allocating section 32 allocates to the first modulated signal ($S_1$) the phase (E), which is advanced by the adjustment phase ($\phi$) from the designated phase ($\theta$), from among the two phases (E, L) calculated by the calculating section 30 (ST22). Furthermore, the allocating section 32 allocates to the second modulated signal ($S_2$) the phase (L), which is delayed by the adjustment phase ($\phi$) from the designated phase ($\theta$), from among the two phases (E, L) calculated by the calculating section 30 (ST22).

When the processes of step ST22 are finished, the allocating section 32 proceeds to process the next sampling rate.

If a first sample is not being processed (the "No" of ST21), the allocating section 32 determines whether a second sample is being processed (ST22). If a second sample is being processed (the "Yes" of step ST23), the allocating section 32 sets the phase ($\theta_1(1)$) of the first modulated signal ($S_1$) in the first sample to be the first predicted phase ($\theta'_1(t)$), which is the predicted phase of the first modulated signal ($S_1$). Furthermore, the allocating section 32 sets the phase ($\theta_2(1)$) of the second modulated signal ($S_2$) in the first sample to be the second predicted phase ($\theta'_2(t)$), which is the predicted phase of the second modulated signal ($S_2$).

If a second sample is not being processed (the "No" of step ST23), the allocating section 32 calculates the first predicted phase ($\theta'_1(t)$) and the second predicted phase ($\theta'_2(t)$) as shown in Expressions 4 and 5 (ST25). In other words, the allocating section 32 calculates the first predicted phase $\theta'_1(t)$ of the first modulated signal ($S_1$) to be the sum of the phase $\theta_1(t-1)$ of the signal point one sample earlier and a value obtained by subtracting the phase $\theta_1(t-2)$ of the signal point two samples earlier from the phase $\theta_1(t-1)$ of the signal point one sample earlier in the first modulated signal ($S_1$). Similarly, the allocating section 32 calculates the second predicted phase $\theta'_2(t)$ of the second modulated signal ($S_2$) to be the sum of the phase $\theta_2(t-1)$ of the signal point one sample earlier and a value obtained by subtracting the phase $\theta_2(t-2)$ of the signal point two samples earlier from the phase $\theta_2(t-1)$ of the signal point one sample earlier in the second modulated signal ($S_2$).

After step ST24 or ST25, the allocating section 32 calculates the first combined change amount E1 and the second combined change amount E2, based on the expressions shown below (ST26).

$$E1 = (Ph(\theta'_1(t) - E(t)))^2 + (Ph(\theta'_2(t) - L(t)))^2$$

$$E2 = (Ph(\theta'_1(t) - L(t)))^2 + (Ph(\theta'_2(t) - E(t)))^2$$

In other words, the allocating section 32 calculates the first combined change amount E1 to be the sum of the square of the phase difference between the first predicted phase ($\theta'_1(t)$) and the phase (E) and the square of the phase difference between the second predicted phase ($\theta'_2(t)$) and the phase (L). The allocating section 32 calculates the second combined change amount E2 to be the sum of the square of the phase difference between the first predicted phase ($\theta'_1(t)$) and the phase (L) and the square of the phase difference between the second predicted phase ($\theta'_2(t)$) and the phase (E).

The first combined change amount E1 represents the change amount resulting from the combination of the frequency change amount of the first modulated signal ($S_1$) and the frequency change amount of the second modulated signal ($S_2$) when the phase (E(t)) is allocated to the first modulated signal ($S_1$) and the phase (L(t)) is allocated to the second modulated signal ($S_2$). The second combined change amount E2 represents the change amount resulting from the combination of the frequency change amount of the first modulated signal ($S_1$) and the frequency change amount of the second modulated signal ($S_2$) when the phase (L(t)) is allocated to the first modulated signal ($S_1$) and the phase (E(t)) is allocated to the second modulated signal ($S_2$).

Next, the allocating section 32 determines whether the first combined change amount E2 is less than the second combined change amount E2 (ST27). If the first combined change amount E2 is less than the second combined change amount E2 (the "Yes" of ST27), the allocating section 32 allocates the phase (E(t)), which is advanced from the designated phase by the adjustment phase, as the first phase ($\theta_1(t)$) to be set for the first modulated signal ($S_1$), and allocates the phase (L(t)), which is delayed from the designated phase by the adjustment phase, as the second phase ($\theta_2(t)$) to be set for the second modulated signal ($S_2$) (ST28).

If the first combined change amount E2 is not less than the second combined change amount E2 (the "No" of ST27), the allocating section 32 allocates the phase (L(t)), which is delayed from the designated phase by the adjustment phase, as the first phase ($\theta_1(t)$) to be set for the first modulated signal ($S_1$), and allocates the phase (E(t)), which is advanced from the designated phase by the adjustment phase, as the second phase ($\theta_2(t)$) to be set for the second modulated signal ($S_2$) (ST29).

When the processes of step ST28 or ST29 are finished, the allocating section 32 proceeds to process the next sampling rate. With the processes described above, the allocating section 32 can allocate the two phases (E, L) calculated by the calculating section 30 to the first modulated signal ($S_1$) and the second modulated signal ($S_2$) such that the first modulated signal ($S_1$) and the second modulated signal ($S_2$) both connect more smoothly.

Figure 9:
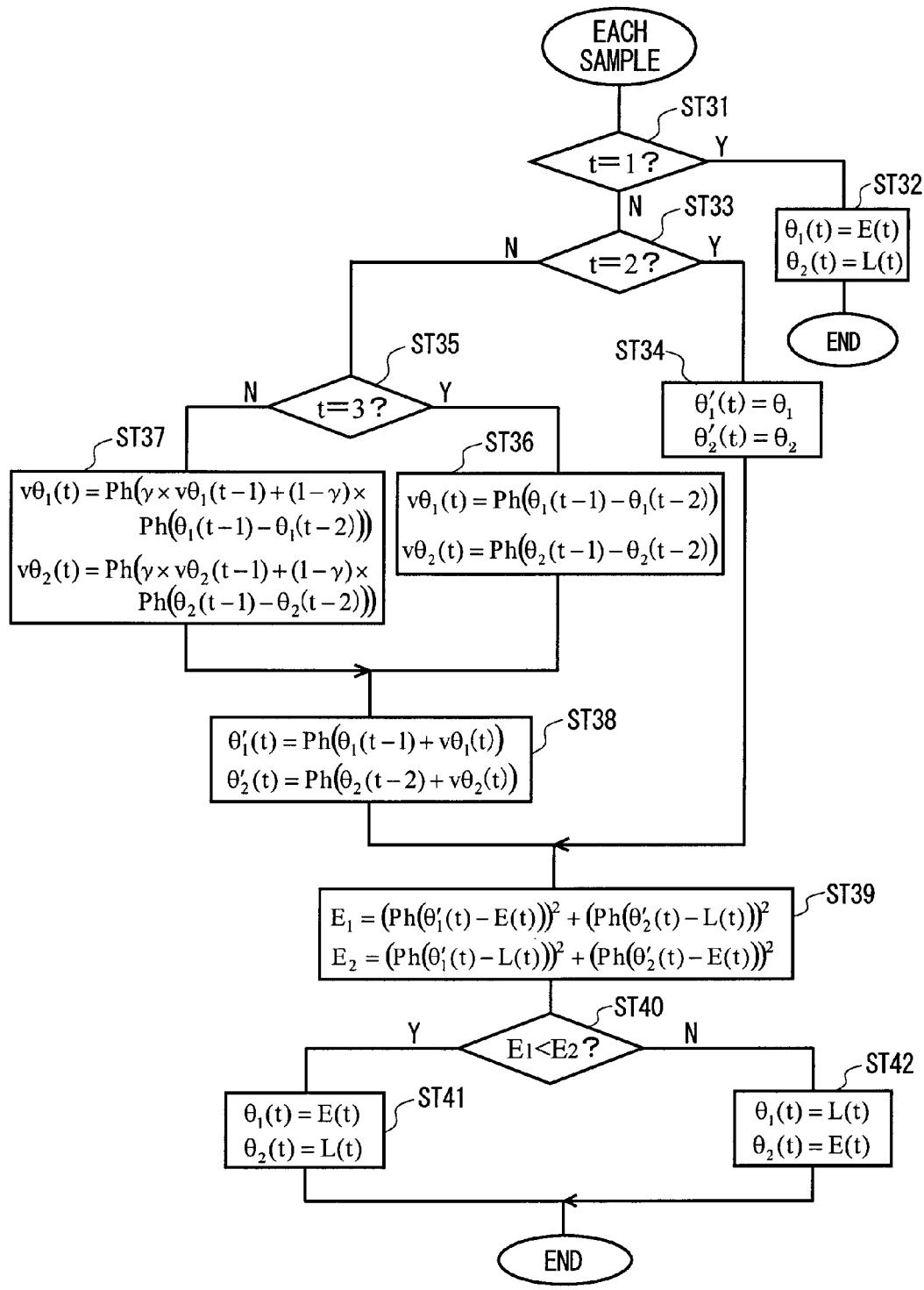
FIG. 9 shows a second process flow of the setting section 34 according to the present embodiment.

FIG. 9 shows a second process flow of the allocating section 32 according to the present embodiment. For each sampling rate, the allocating section 32 performs the processes of steps ST31 to ST42 shown in FIG. 9. Steps ST31 to ST34 are the same as steps ST21 to ST24 in FIG. 8, and therefore description of these steps is omitted. Furthermore, steps ST39 to ST42 are the same as steps ST26 to ST29 in FIG. 8, and therefore description of these steps is omitted.

If a second sample is not being processed (the "No" of ST33), the allocating section 32 determines whether a third sample is being processed (ST35). If a third sample is being processed (the "Yes" of ST35), the allocating section 32 sets, as the average phase difference ($v\theta_1(t)$) of the first modulated signal ($S_1$), a value obtained by subtracting the phase ($\theta_1(1)$) of the signal point two samples earlier from the phase ($\theta_1(2)$) of the signal point one sample earlier in the first modulated signal ($S_1$) (ST36). Furthermore, the allocating section 32 sets, as the average phase difference ($v\theta_2(t)$) of the second modulated signal ($S_2$), a value obtained by subtracting the phase ($\theta_2(1)$) of the signal point two samples earlier from the phase ($\theta_2(2)$) of the signal point one sample earlier in the second modulated signal ($S_2$) (ST36).

If a third sample is not being processed (the "No" of ST35), the allocating section 32 calculates the average phase differences ($v\theta_2(t)$, $v\theta_2(t)$) according to Expressions 8 and 9 (ST37). In other words, the allocating section 32 calculates the average phase difference ($v\theta_1(t)$) of the first modulated signal to be the sum of the product of the effect coefficient and the average phase difference one sample earlier in the first modulated signal and a product of a value obtained by subtracting the effect coefficient from 1 and a value obtained by subtracting the phase of the signal point two samples earlier from the phase of the signal point one sample earlier in the first modulated signal. Similarly, the calculating section 30 calculates the average phase difference ($v\theta_2(t)$) of the second modulated signal to be the sum of a product of the effect coefficient and the average phase difference one sample earlier in the second modulated signal and a product of a value obtained by subtracting the effect coefficient from 1 and a value obtained by subtracting the phase of the signal point two samples earlier from the phase of the signal point one sample earlier in the second modulated signal.

After the processes of step ST36 or ST37, the allocating section 32 calculates the first predicted phase $\theta'_1(t)$ and the second predicted phase $\theta'_2(t)$ as shown in Expressions 6 and 7 (ST38). In other words, the allocating section 32 calculates the first predicted phase $\theta'_1(t)$ as the sum of the phase $\theta_1(t-1)$ of the signal point one sample earlier in the first modulated signal ($S_1$) and the average phase difference $v\theta_1(t)$ of the first modulated signal ($S_1$) calculated in step ST36 or ST37. Furthermore, the allocating section 32 calculates the second predicted phase $\theta'_2(t)$ as the sum of the phase $\theta_2(t-1)$ of the signal point one sample earlier in the second modulated signal ($S_2$) and the average phase difference $v\theta_2(t)$ of the second modulated signal ($S_2$) calculated in step ST36 or ST37.

After step ST38, the allocating section 32 proceeds to the process of step ST39. With the processes described above, the allocating section 32 can allocate the two phases (E, L) calculated by the calculating section 30 to the first modulated signal ($S_1$) and the second modulated signal ($S_2$) such that the first modulated signal ($S_1$) and the second modulated signal ($S_2$) both connect more smoothly.

Figure 10:
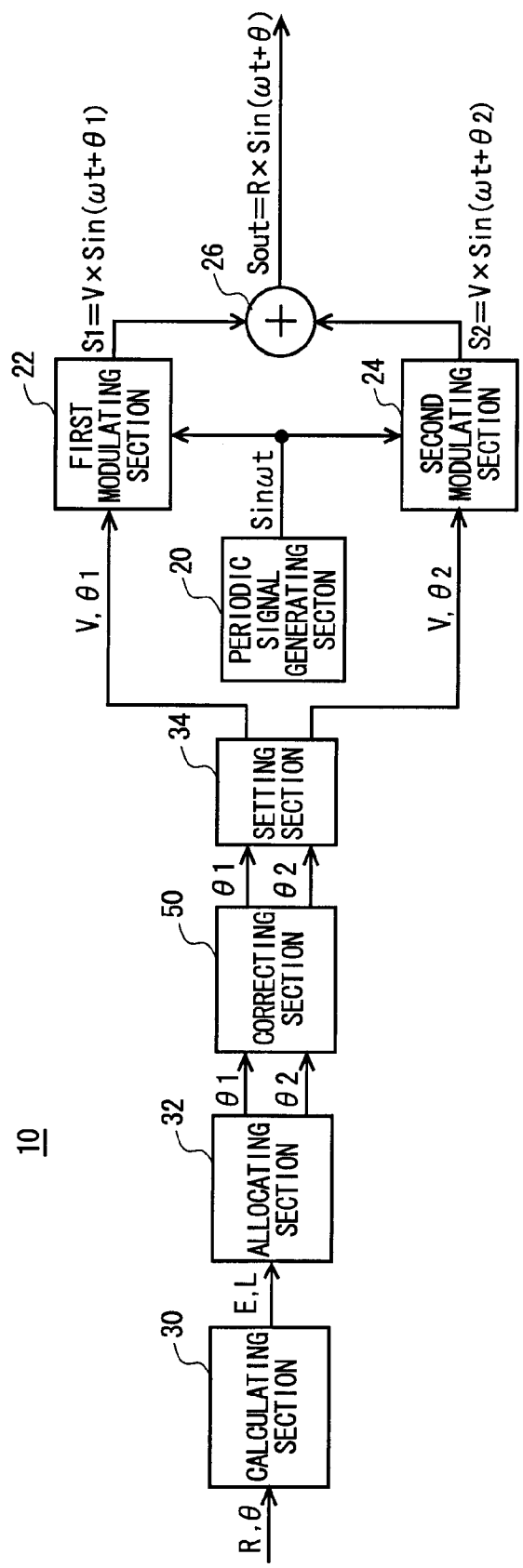
FIG. 10 shows a configuration of the modulation apparatus 10 according to a modification of the present embodiment.

FIG. 10 shows a configuration of the modulation apparatus 10 according to a modification of the present embodiment. The modulation apparatus 10 of the present modification adopts substantially the same function and configuration as the modulation apparatus 10 shown in FIG. 1, and therefore components in FIG. 10 that have substantially the same function and configuration as components shown in FIG. 1 are given the same reference numerals and the following description contains only differing points.

The modulation apparatus 10 of the present modification further includes a correcting section 50. The correcting section 50 corrects the phases set in the first modulating section 22 and the second modulating section 24.

The first modulating section 22 and the second modulating section 24 each have frequency characteristics. Accordingly, the first modulating section 22 and the second modulating section 24 output the first modulated signal ($S_1$) and the second modulated signal ($S_2$) with more distortion when the frequency band to be output is wider.

To solve this problem, the phases to be set in the first modulating section 22 and the second modulating section 24 can achieve band-limiting. In this case, the first modulating section 22 and the second modulating section 24 can output the first modulated signal ($S_1$) and the second modulated signal ($S_2$) with less distortion since the frequency bands of the signals to be output are narrower.

However, when the phases to be set in the first modulating section 22 and the second modulating section 24 cause excessive band-limiting, the resulting error with respect to the phase to be set when band-limiting is not performed increases. Accordingly, in this case, the distortion in the first modulated signal ($S_1$) and the second modulated signal ($S_2$) is even greater than when band-limiting is not performed.

In other words, there is a trade-off relationship between the amount that the error increases when the degree of the band-limiting, i.e. the filtering strength, is too large and the amount that the frequency band increases when the degree of the band-limiting is lowered, such that one decreases when the other increases.

Therefore, the correcting section 50 calculates the phases that result in the smallest bandwidth as the phases to be set in the first modulating section 22 and the second modulating section 24. In this case, the correcting section 50 calculates the phases minimizing the bandwidth by using a predetermined computation based on a plurality of previously set phases. For example, the correcting section 50 may make this calculation based on a difference between the phase one sample earlier and the phase two samples earlier. The predetermined computation for calculating the phases that minimize bandwidth may by any type of computation.

The correcting section 50 sets, in each of the first modulating section 22 and the second modulating section 24, a phase that minimizes the total negative effect resulting from a combination of a mismatch amount, which indicates the amount of increase in the error of the phase that minimizes the bandwidth, and a frequency increase amount, which indicates the amount that the frequency band increases, between the phase resulting from the phase to be set not achieving band-limiting and the phase to be set that minimizes bandwidth. As a result, the correcting section 50 can decrease the overall distortion in the first modulated signal ($S_1$) and the second modulated signal ($S_2$) by appropriately setting the amount of increase of the frequency band and the amount of increase of the error caused by band-limiting due to the phases to be set.

The following is a more detailed description of the method by which the correcting section 50 calculates the phases to be set in the first modulating section 22 and the second modulating section 24.

When describing the method for calculating the phases to be set in the first modulating section 22 and the second modulating section 24, $\theta_1(t-1)$, $\theta_2(t-1)$, $\theta_1(t-2)$, $\theta_2(t-2)$, $\theta'_1(t)$, $\theta'_2(t)$, $\theta''_1(t)$, $\theta''_2(t)$, $\theta_1(t)$, and $\theta_2(t)$ are used as variables.

$\theta_1(t-1)$ represents the phase of the first modulated signal ($S_1$) one sample earlier. $\theta_2(t-1)$ represents the phase of the second modulated signal ($S_2$) one sample earlier. $\theta_1(t-2)$ represents the phase of the first modulated signal ($S_1$) two samples earlier. $\theta_2(t-2)$ represents the phase of the second modulated signal ($S_2$) two samples earlier.

$\theta'_1(t)$ represents the phase of the first modulated signal ($S_1$) in the current sample when the bandwidth is minimized. In the present example, $\theta'_1(t)$ is calculated based on $\theta_1(t-1)$ and $\theta_1(t-2)$.

$\theta'_2(t)$ represents the phase of the second modulated signal ($S_2$) in the current sample when the bandwidth is minimized. In the present example, $\theta'_2(t)$ is calculated based on $\theta_2(t-1)$ and $\theta_2(t-2)$.

$\theta''_1(t)$ represents the phase of the first modulated signal ($S_1$) of the current sample when band-limiting is not performed. In other words, $\theta''_1(t)$ represents the phase set in the first modulating section 22 when the phase calculated based on the expected amplitude (R) and the expected phase ($\theta$) is not corrected.

$\theta''_2(t)$ represents the phase of the second modulated signal ($S_2$) of the current sample when band-limiting is not performed. In other words, $\theta''_2(t)$ represents the phase set in the second modulating section 24 by the allocating section 32 when the phase calculated based on the expected amplitude (R) and the expected phase ($\theta$) is not corrected.

$\theta_1(t)$ represents the phase of the first modulated signal ($S_1$) after correction by the correcting section 50. $\theta_1(t)$ is a phase between $\theta'_1(t)$ and $\theta''_1(t)$.

$\theta_2(t)$ represents the phase of the second modulated signal ($S_2$) after correction by the correcting section 50. $\theta_2(t)$ is a phase between $\theta'_2(t)$ and $\theta''_2(t)$.

The output signal output when band-limiting is not performed is expressed as $Sout''=Aout''(t)\angle\theta out''(t)$, where $Aout''(t)$ and $\theta out''(t)$ are calculated as shown below.

$$\Delta\theta''(t)=(Ph(\theta''_2(t)-\theta''_1(t)))/2$$

$$\theta out''(t)=Ph(\theta''_1(t)+\Delta\theta''(t))$$

$$Aout''(t)=2\times V\times\cos(\Delta\theta''(t))$$

The following describes the mismatch amount, which indicates the amount of increase in the error, and the frequency increase amount, which indicates the amount that the frequency band increases, when the bandwidth is minimized.

The correcting section 50 may calculate the phases of the first modulated signal ($S_1$) and the second modulated signal ($S_2$) when the bandwidth is minimized using Expressions 11 and 12 shown below.

$$\theta'_1(t)=Ph(\theta_1(t-1)+Ph(\theta_1(t-1)-\theta_1(t-2))) \quad (11)$$

$$\theta'_2(t)=Ph(\theta_2(t-1)+Ph(\theta_2(t-1)-\theta_2(t-2))) \quad (12)$$

The correcting section 50 may calculate the phases of the first modulated signal ($S_1$) and the second modulated signal ($S_2$) when the bandwidth is minimized using a computation other than Expressions 11 and 12. For example, the correcting section 50 may calculate the phases when the bandwidth is minimized using Expressions 6 and 7.

The output signal output when the bandwidth is minimized is expressed as $Sout'=Aout'(t)\angle\theta out'(t)$, where $Aout'(t)$ and $\theta out'(t)$ are calculated as shown below.

$$\Delta\theta'(t)=(Ph(\theta'(t)-\theta'_1(t)))/2$$

$$\theta out'(t)=Ph(\theta'_1(t)+\Delta\theta'(t))$$

$$Aout'(t)=2\times V\times\cos(\Delta\theta'(t))$$

In this case, the mismatch amount $\Delta D'$ of the vector of the output signal when the bandwidth is minimized is calculated as shown below. $ABS(x)$ is a function repeating the absolute value of x.

$$\Delta D'=ABS(Sout''(t)-Sout'(t))$$

The frequency change amount $B'_1(t)$ of the first modulated signal when the bandwidth is minimized is calculated as shown below. In this case, since the bandwidth is minimized, $d^2\theta_1(t)/dt^2=0$. Furthermore, the bandwidth increase amount due to FM modulation is approximated as being equal to the acceleration of the frequency change amount, i.e. the phase.

$$B'_1(t) = ABS\left(\frac{d\theta_1(t)}{dt}\right) + ABS\left(\frac{d^2\theta_1(t)}{dt^2}\right) \approx ABS(Ph(\theta_1(t-1)-\theta_1(t-2)))$$

The frequency change amount $B'_2(t)$ of the second modulated signal ($S_2$) when the bandwidth is minimized is calculated as shown below $$B'_2(t)=ABS(Ph(\theta_2(t-1)-\theta_2(t-2)))$$

Here, the frequency increase amount $EB'$, which represents the increase amount of the frequency band when the bandwidth is minimized, is set as shown below in Expression 21. The mismatch amount $ED'$, which represents the increase amount of the phase error when the bandwidth is minimized, is set as shown below in Expression 22.

$$EB'=(B'_1(t)+B'_2(t))/B_0 \quad (21)$$

$$ED'=\Delta D'/D_0 \quad (22)$$

Here, $B_0$ and $D_0$ are constants, and may be set in advance for each piece of hardware and each frequency band.

The following describes the frequency band increase amount indicating the increase amount of the frequency band when band-limiting is not performed. The frequency change amount $B''_1(t)$ of the first modulated signal ($S_1$) when band-limiting is not performed is expressed as shown below. In this case, the bandwidth increase amount due to the FM modulation is approximated as being equal to the acceleration of the frequency change amount, i.e. the phase.

$$B''_1(t) = ABS\left(\frac{d\theta_1(t)}{dt}\right) + ABS\left(\frac{d^2\theta_1(t)}{dt^2}\right) \approx B'_1(t) + ABS(Ph(\theta''_1(t) - \theta'_1(t)))$$

The frequency change amount $B''_2(t)$ of the second modulated signal ($S_2$) when band-limiting is not performed is calculated as shown below.

$$B''_2(t)=B'_2(t)+ABS(Ph(\theta''_2(t)-\theta'_2(t)))$$

When the bandwidth is not limited, the mismatch amount $D''$ of the vector of the output signal is zero.

Here, the frequency increase amount $EB''$, which represents the increase amount of the frequency band when band-limiting is not performed, is set as shown below in Expression 31. The mismatch amount $ED''$, which represents the increase amount of the phase error when band-limiting is not performed, is set as shown below in Expression 32.

$$EB''=(B''_1(t)+B''_2(t))/B_0 \quad (31)$$

$$ED''=\Delta D''/D_0=0 \quad (32)$$

The following describes the variable $\beta$ for combining the case where band-limiting is not performed and the case where the bandwidth is minimized.

The correcting section 50 calculates the phase ($\theta_1(t)$) of the corrected first modulated signal ($S_1$) to be a phase between the phase ($\theta'1$) used when the bandwidth is minimized and the phase ($\theta''1$) used when band-limiting is not performed. Similarly, the correcting section 50 calculates the phase ($\theta_2(t)$) of the corrected second modulated signal ($S_2$) to be a phase between the phase ($\theta'2$) used when the bandwidth is minimized and the phase ($\theta''2$) used when band-limiting is not performed.

The variable $\beta$ is now set. $\beta$ is a value no less than 0 and no greater than 1, and represents a distance of the phase that minimizes the total negative effect, which is between the phase used when the bandwidth is minimized and the phase used when band-limiting is not performed, from the phase used when band-limiting is not performed. Using $\beta$ in this way, the phase ($\theta_1(t)$) of the first modulated signal ($S_1$) and the phase ($\theta_2(t)$) of the second modulated signal ($S_2$) can be calculated as shown below in Expressions 41 and 42.

$$\theta_1(t)=Ph(\theta'_1(t)+\beta\times Ph(\theta''_1((t)-\theta'_1(t))) \quad (41)$$

$$\theta_2(t)=Ph(\theta'_2(t)+\beta\times Ph(\theta''_2((t)-\theta'_2(t))) \quad (42)$$

Figure 11:
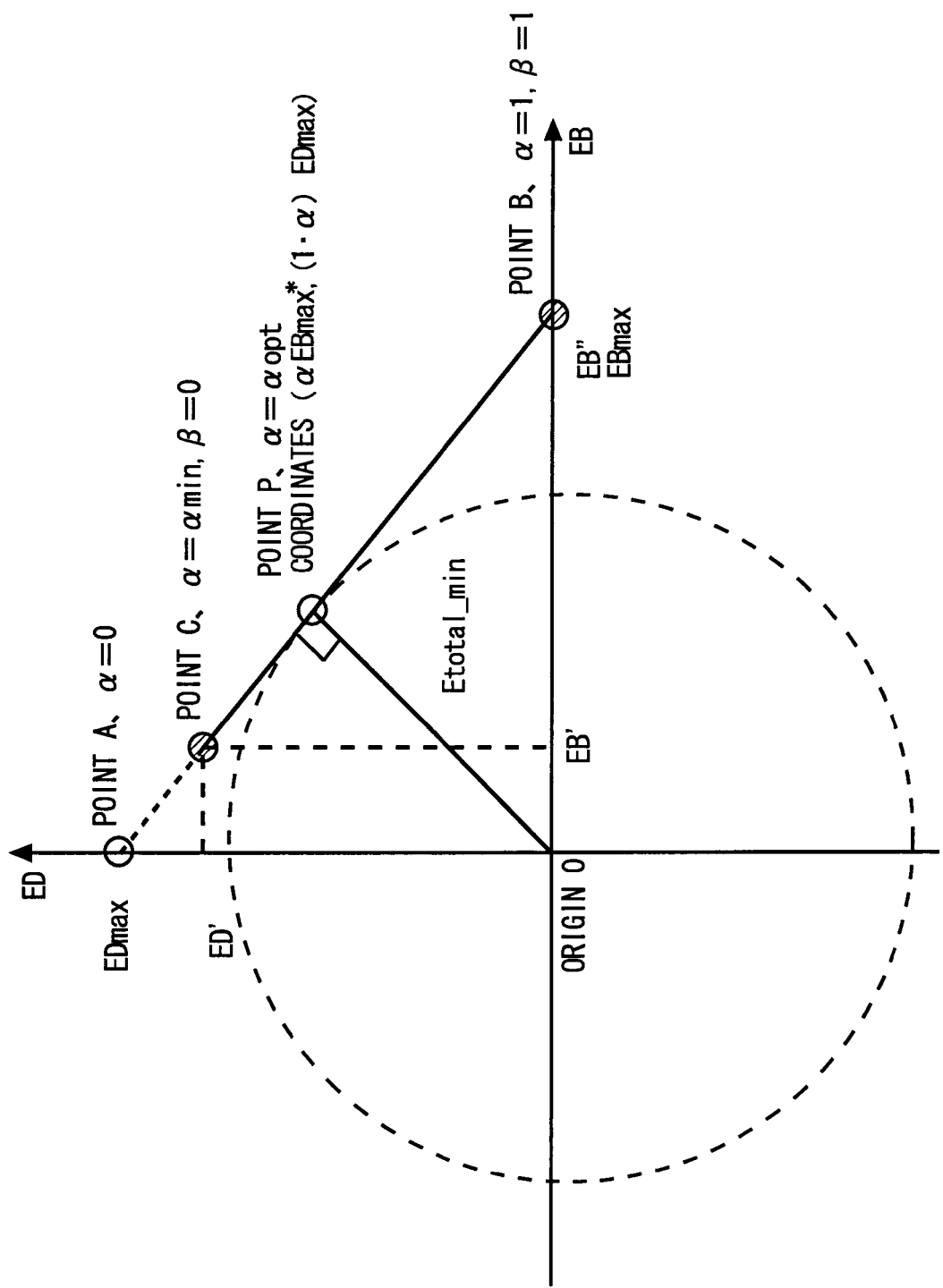
FIG. 11 shows the variables α and β, with the X-axis representing the frequency increase amount EB and the Y-axis representing the mismatch amount ED.

FIG. 11 shows the variables $\alpha$ and $\beta$, with the X-axis representing the frequency increase amount EB and the Y-axis representing the mismatch amount ED.

With the X-axis representing the frequency increase amount EB and the Y-axis representing the mismatch amount ED, $\beta$ can be approximated by a straight line between point B (EB'', 0) and point C (EB', ED').

Here, the variable $\alpha$ is set to be on a straight line between point A (0, EDmax) and point B (EB'', 0). EDmax and EBmax can be calculated as shown below in Expressions 51 and 52.

$$EDmax=(EB''\times ED')/(EB''-EB') \quad (51)$$

$$EBmax=EB'' \quad (52)$$

The variable $\alpha$ is equal to 0 at point A and equal to 1 at point B. The variable $\alpha$ increases proportionally as the distance from point A increases. The variable β can be expressed using α as shown below in Expression 53.

$$\beta = \frac{\alpha - \alpha\min}{1 - \alpha\min} \quad (53)$$

Here, a value for the variable α that minimizes the total negative effect Etotal that includes the mismatch degree ED and the frequency increase amount EB is considered.

The total negative effect Etotal is calculated as SQRT (EB²+ED²). In this case, the total negative effect Etotal is minimized when a circle centered on the origin O contacts a straight line between point A and point B. Therefore, the variable α at the point P where the circle centered on the origin O contacts the straight line between point A and point B is referred to as αopt. Here, αopt can be calculated as shown below in Expression 54.

$$\alpha opt = \frac{ED\max^2}{ED\max^2 + EB\max^2} \quad (54)$$

Since the resulting phase is between the band-limiting phase and the expected phase used when band-limiting is not performed, α has a value between point B and point C. In other words, α does not have a value that is on the point A side of point C. With the α value at point C represented as αmin, the value that α can have is in a range of αmin≤α≤1, i.e. α is no less than αmin and no greater than 1. Here, αmin can be expressed as shown below in Expression 55.

αmin=EB'/EB'' (55)

Based on the above, the α value that minimizes the total negative effect can be expressed as shown below in Expression 56.

α=αopt(when αop≥αmin)

α=αmin(when αopt<αmin) (56)

In other words, when αopt is greater than or equal to αmin, α is equal to αopt. Furthermore, when αopt is less than αmin, α is equal to αmin.

In summary, the correcting section 50 calculates the phase to be set in the first modulating section 22 based on Expression 101 and calculates the phase to be set in the second modulating section 24 based on Expression 102, as shown below.

θ₁(t)=Ph(θ'₁(t)+β×Ph(θ''₁(t)−θ'₁(t))) (101)

θ₂(t)=Ph(θ'₂(t)+β×Ph(θ''₂(t)−θ'₂(t))) (102)

In Expressions 101 and 102, the correcting section 50 calculates β based on Expression 103 shown below.

$$\beta = \frac{\alpha - \alpha\min}{1 - \alpha\min} \quad (103)$$

In Expression 103, α has the value that minimizes the total negative effect, as shown above in Expression 56.

Figure 12:
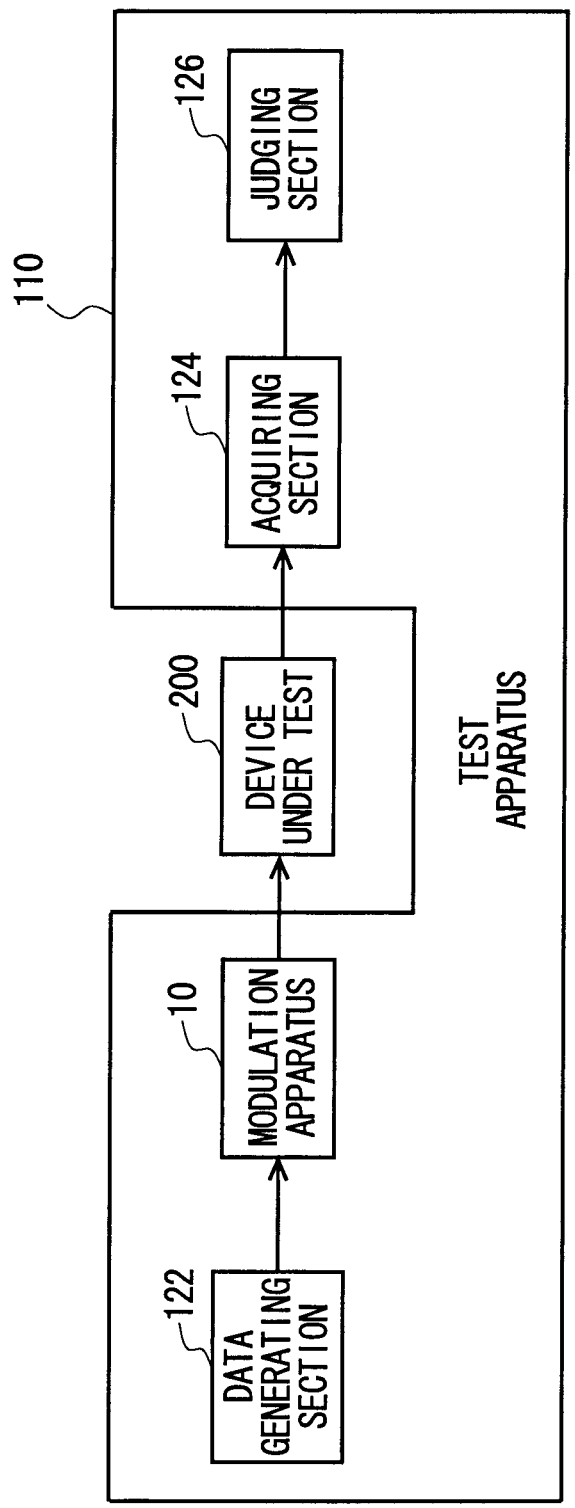
FIG. 12 shows an exemplary test apparatus 110 according to the present embodiment.

FIG. 12 shows an exemplary test apparatus 110 according to the present embodiment. The test apparatus 110 of the present embodiment tests a device under test 200 by supplying a modulated signal thereto.

The test apparatus 110 includes a data generating section 122, the modulation apparatus 10, an acquiring section 124, and a judging section 126. The data generating section 122 designates the amplitude and the phase of the modulated signal to be input to the device under test 200.

The modulation apparatus 10 supplies the device under test 200 with the modulated signal corresponding to the amplitude and phase designated by the data generating section 122. The modulation apparatus 10 is the same as the modulation apparatus 10 described in FIGS. 1 to 11, and therefore a detailed description is omitted.

The acquiring section 124 acquires a signal output by the device under test 200 in response to the modulated signal input to the device under test 200. The judging section 126 judges pass/fail of the device under test 200 based on the signal acquired by the acquiring section 124.

The test apparatus 110 of the present embodiment generates the modulated signal supplied to the device under test 200 using the modulation apparatus 10, and therefore has a smaller structure. Furthermore, the test apparatus 110 can stably and accurately test the device under test 200.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A modulation apparatus that outputs an output signal having a designated amplitude and a designated phase, the modulation apparatus comprising:

a first modulating section that outputs a first modulated signal having a predetermined fixed amplitude and a set phase;

a second modulating section that outputs a second modulated signal having the fixed amplitude and a set phase;

an adding section that outputs the output signal to be the sum of the first modulated signal and the second modulated signal;

a calculating section that calculates two phases to be set respectively in the first modulating section and the second modulating section, based on the designated amplitude and the designated phase;

an allocating section that allocates, for the first modulated signal and the second modulated signal, the two phases calculated by the calculating section such that the first modulated signal and the second modulated signal are each connected more smoothly; and a setting section that sets the phase allocated for the first modulated signal in the first modulating section and sets the phase allocated for the second modulated signal in the second modulating section.

2. The modulation apparatus according to claim 1, wherein
the calculating section sets an adjustment phase to be an arc-cosine of a ratio of half the designated amplitude to the fixed amplitude, and
the calculating section calculates the two phases to respectively be a phase advanced by the adjustment phase from the designated phase and a phase delayed by the adjustment phase from the designated phase.

3. The modulation apparatus according to claim 2, wherein
the allocating section allocates, for the first modulated signal, the phase, among the two phases calculated by the calculating section, that is closer to a predicted phase that is predicted based on previous signal points of the first modulated signal.

4. The modulation apparatus according to claim 3, wherein
the allocating section calculates the predicted phase based on a difference between a phase of a signal point one sample earlier in the first modulated signal and a phase of a signal point two samples earlier in the first modulated signal.

5. The modulation apparatus according to claim 4, wherein
when processing a first sample, the allocating section allocates, for the first modulated signal, a phase advanced by the adjustment phase from the designated phase.

6. The modulation apparatus according to claim 5, wherein
the allocating section sets the predicted phase of a second sample of the first modulated signal to be the phase allocated for the first sample of the first modulated signal.

7. The modulation apparatus according to claim 4, wherein
the allocating section calculates the predicted phase to be a sum of the phase of the signal point one sample earlier in the first modulated signal and an average phase obtained as a weighted average of a phase difference between previous samples of the first modulated signal.

8. The modulation apparatus according to claim 1, wherein
the calculating section calculates a first predicted phase that is predicted based on previous signal points in the first modulated signal and a second predicted phase that is predicted based on previous signal points in the second modulated signal, and
the calculating section calculates the two phases to be set respectively in the first modulating section and the second modulating section to be a phase advanced by 90 degrees from an intermediate phase between the first predicted phase and the second predicted phase and a phase delayed by 90 degrees from the intermediate phase between the first predicted phase and the second predicted phase.

9. The modulation apparatus according to claim 8, wherein
the calculating section calculates the first predicted phase and the second predicted phase based on a difference between a phase of a signal point one sample earlier and a phase of a signal point two samples earlier in the first modulated signal and the second modulated signal, respectively.

10. The modulation apparatus according to claim 9, wherein
the calculating section calculates a phase advanced by 90 degrees from the intermediate phase on a narrow-angle side of the first predicted phase and the second predicted phase and calculates a phase delayed by 90 degrees from the intermediate phase on the narrow-angle side of the first predicted phase and the second predicted phase.

11. The modulation apparatus according to claim 1, further comprising a correcting section that corrects the phases set in the first modulating section and the second modulating section, wherein
the correcting section sets, in each of the first modulating section and the second modulating section, a phase that minimizes total negative effect, which is a combination of a mismatch amount indicating an amount of increase in error when bandwidth is minimized and a frequency increase amount indicating an increase amount of a frequency bandwidth, the phase being between a phase set to minimize bandwidth and a phase set to not limit bandwidth.

12. The modulation apparatus according to claim 11, wherein
the correcting section calculates the phase to be set in the first modulating section based on Expression 101 and calculates the phase to be set in the second modulating section based on Expression 102,
Expression 101 is defined as $\theta_1(t)=Ph(\theta'_1(t)+\beta \times Ph(\theta''_1(t)-\theta'_1(t)))$,
Expression 102 is defined as $\theta_2(t)=Ph(\theta'_2(t)+\beta \times Ph(\theta''_2(t)-\theta'_2(t)))$,
$\theta'_1(t)$ and $\theta'_2(t)$ respectively represent the phases to be set in the first modulating section and the second modulating section for minimizing bandwidth,
$\theta''_1(t)$ and $\theta''_2(t)$ respectively represent the phases to be set in the first modulating section and the second modulating section for not limiting bandwidth,
$\beta$ is a value no less than 0 and no greater then 1 indicating distance, from the phase that does not limit bandwidth, of the phase that minimizes the total negative effect and that is between the phase not limiting bandwidth and the phase minimizing bandwidth, and
$y=Ph(x)$ represents a function in which an input x returns a y value of $-180° \leq \theta \leq 180°$.

13. The modulation apparatus according to claim 12, wherein
the correcting section calculates $\beta$ based on the frequency increase amount and the mismatch amount when the phase to be set in the first modulating section and the second modulating section minimizes bandwidth and on the frequency increase amount when the phase to be set in the first modulating section and the second modulating section does not limit bandwidth.

14. The modulation apparatus according to claim 13, wherein
the correcting section calculates $\beta$ based on expression 103,
Expression 103 is defined as:

$$\beta = \frac{\alpha - \alpha \min}{1 - \alpha \min}, \tag{103}$$

$\alpha$ is a value in a range of $\alpha \min \leq \alpha \leq 1$,
$\alpha \min$ represents $EB'/EB''$,
$EB'$ represents the frequency increase amount when the phase to be set minimizes bandwidth, and
$EB''$ represents the frequency increase amount when the phase to be set does not limit bandwidth.

15. The modulation apparatus according to claim 14, wherein
the correcting section calculates $\alpha$ based on Expression 104, Expression 104 is defined as α=αopt (when αopt≥αmin) and α=αmin (when αopt<αmin),
αopt is expressed as shown in Expression 105,
Expression 105 is defined as:

$$\alpha opt = \frac{ED\max^2}{ED\max^2 + EB\max^2}, \quad (105)$$

EDmax represents (EB"×ED')/(EB"−EB'),
EBmax represents EB", and
ED' represents the mismatch amount when the phase to be set minimizes bandwidth.

16. A phase setting method for setting a phase in a modulation apparatus that outputs an output signal having a designated amplitude and a designated phase, wherein the modulation apparatus includes:
a first modulating section that outputs a first modulated signal having a predetermined fixed amplitude and a set phase;
a second modulating section that outputs a second modulated signal having the fixed amplitude and a set phase; and
an adding section that outputs the output signal to be the sum of the first modulated signal and the second modulated signal, the phase setting method comprising:
calculating two phases to be set respectively in the first modulating section and the second modulating section, based on the designated amplitude and the designated phase;
allocating the two calculated phases for the first modulated signal and the second modulated signal, such that the first modulated signal and the second modulated signal are each connected more smoothly; and
setting the phase allocated for the first modulated signal in the first modulating section and setting the phase allocated for the second modulated signal in the second modulating section.

17. The phase setting method according to claim 16, comprising:
calculating a first predicted phase that is predicted based on previous signal points in the first modulated signal and a second predicted phase that is predicted based on previous signal points in the second modulated signal, and
calculating the two phases to be set respectively in the first modulating section and the second modulating section to be a phase advanced by 90 degrees from an intermediate phase between the first predicted phase and the second predicted phase and a phase delayed by 90 degrees from the intermediate phase between the first predicted phase and the second predicted phase.

18. The phase setting method according to claim 17, comprising:
calculating the phase to be set in the first modulating section based on Expression 101 and calculating the phase to be set in the second modulating section based on Expression 102, wherein
Expression 101 is defined as $\theta_1(t)=Ph(\theta'_1(t)+\beta \times Ph(\theta''_1(t)-\theta'_1(t)))$,
Expression 102 is defined as $\theta_2(t)=Ph(\theta'_2(t)+\beta \times Ph(\theta''_2(t)-\theta'_2(t)))$,
$\theta'_1(t)$ and $\theta'_2(t)$ respectively represent the phases to be set in the first modulating section and the second modulating section for minimizing bandwidth,
$\theta''_1(t)$ and $\theta''_2(t)$ respectively represent the phases to be set in the first modulating section and the second modulating section for not limiting bandwidth,
$\beta$ is a value no less than 0 and no greater then 1 indicating distance, from the phase that does not limit bandwidth, of a phase that minimizes a total negative effect and that is between the phase not limiting bandwidth and the phase minimizing bandwidth, and
$y=Ph(x)$ represents a function in which an input x returns a y value of $-180° \leq \theta \leq 180°$.

19. A test apparatus that tests a device under test by supplying the device under test with a modulated signal, the test apparatus comprising:
a data generating section that designates an amplitude and a phase of the modulated signal;
the modulation apparatus according to claim 1 that supplies the device under test with the modulated signal corresponding to the amplitude and phase designated by the data generating section;
an acquiring section that acquires a signal output by the device under test in response to the modulated signal; and
a judging section that judges pass/fail of the device under test according to the signal acquired by the acquiring section.

* * * * *